US009154452B2

(12) United States Patent
Thottan et al.

(10) Patent No.: US 9,154,452 B2
(45) Date of Patent: Oct. 6, 2015

(54) METHODS AND APPARATUSES FOR ADAPTING BUFFER CAPACITY AT ROUTERS

(75) Inventors: Marina Thottan, Westfield, NJ (US); Arun Vishwanath, Travancore (AU); Vijay Sivaraman, Gladesville (AU); David Neilson, Old Bridge, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 723 days.

(21) Appl. No.: 13/434,080

(22) Filed: Mar. 29, 2012

(65) Prior Publication Data

US 2013/0259063 A1    Oct. 3, 2013

(51) Int. Cl.
*H04L 12/861*    (2013.01)
(52) U.S. Cl.
CPC .................................. *H04L 49/9005* (2013.01)
(58) Field of Classification Search
None
See application file for complete search history.

(56) References Cited

U.S. PATENT DOCUMENTS

2005/0240745 A1*  10/2005  Iyer et al. .................... 711/167
2007/0097864 A1*  5/2007   Bernstein .................... 370/232

* cited by examiner

*Primary Examiner* — Ian N Moore
*Assistant Examiner* — Brian T Le
(74) *Attorney, Agent, or Firm* — Harness, Dickey & Pierce, P.L.C.

(57) ABSTRACT

In a method for dynamic buffer adjustment at a line card of router, a current buffer occupancy at the line card is compared with at least a first buffer occupancy threshold, the first buffer occupancy threshold being calculated based on a buffer occupancy threshold parameter and a capacity of at least a first buffer memory at the line card; and an active buffer capacity is adjusted by at least one of activating and deactivating buffer memory blocks at the line card based on the comparing step, the activating including switching on the buffer memory blocks, and the deactivating including causing the buffer memory blocks to enter a sleep state.

20 Claims, 4 Drawing Sheets

METHODS AND APPARATUSES FOR ADAPTING BUFFER CAPACITY AT ROUTERS

BACKGROUND OF THE INVENTION

Reducing power consumption of core Internet routers is important for both Internet Service Providers (ISPs) and router vendors. Reduced power consumption can enable ISPs to reduce their carbon footprint and operational costs, while enabling router manufacturers to achieve higher switching capacity per rack.

SUMMARY OF THE INVENTION

Example embodiments provide methods and/or apparatuses for buffer management at line cards and/or routers in a network. According to at least some example embodiments, buffers (or buffer memory) is/are activated incrementally as needed, and deactivated (put to sleep) when not needed or not in use.

Dynamic adjustment of active router buffer size provides a relatively low-complexity and relatively low-risk mechanism of saving energy that is amenable for incremental deployment in today's networks.

At least one example embodiment provides a line card for a router. According to at least this example embodiment, the line card includes: at least a first buffer memory; and a line card processor configured to compare a current buffer occupancy at the line card with at least a first buffer occupancy threshold, the first buffer occupancy threshold being calculated based on a buffer occupancy threshold parameter and a capacity of the first buffer memory at the line card, the line card processor being further configured to adjust an active buffer capacity by at least one of activating and deactivating buffer memory blocks at the line card based on the comparison, the activating including switching on the buffer memory blocks, and the deactivating including causing the buffer memory blocks to enter a sleep state.

At least one other example embodiment provides a method for dynamic buffer adjustment at a line card of a router. According to at least this example embodiment, the method includes: comparing a current buffer occupancy at the line card with at least a first buffer occupancy threshold, the first buffer occupancy threshold being calculated based on a buffer occupancy threshold parameter and a capacity of at least a first buffer memory at the line card; and adjusting an active buffer capacity by at least one of activating and deactivating buffer memory blocks at the line card based on the comparing step, the activating including switching on the buffer memory blocks, and the deactivating including causing the buffer memory blocks to enter a sleep state.

At least one other example embodiment provides a router including a plurality of line cards. Each of the plurality of line cards includes: at least a first buffer memory; and a line card processor configured to compare a current buffer occupancy at the router with at least a first buffer occupancy threshold, the first buffer occupancy threshold being calculated based on a buffer occupancy threshold parameter and a capacity of the first buffer memory at the router, the line card processor being further configured to adjust an active buffer capacity by at least one of activating and deactivating buffer memory blocks at the router based on the comparison, the activating including switching on the buffer memory blocks, and the deactivating including causing the buffer memory blocks to enter a sleep state.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, may be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing routers or other network elements. Such existing hardware may include one or more Central Processing Units (CPUs), digital signal processors (DSPs), application-specific-integrated-circuits (ASICs), field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments are primarily concerned with ingress and egress packet buffering at line cards within a communications network. In network architectures supporting back-pressure, ingress packet buffers absorb (link or fabric) congestion, and egress packet buffers absorb output link congestion.

Packet buffer memory architectures vary from platform to platform. So, for the purposes of this disclosure, a fairly generic three-level hierarchical model is considered. The three-level hierarchical model includes on-chip buffers within a network processor (NP) or application specific integrated circuit (ASIC), off-chip cache static random access memory (SRAM), and off-chip bulk dynamic random access memory (DRAM).

The buffer memory discussed herein may be any suitable type of memory, such as flash memory or the like.

Figure 1:
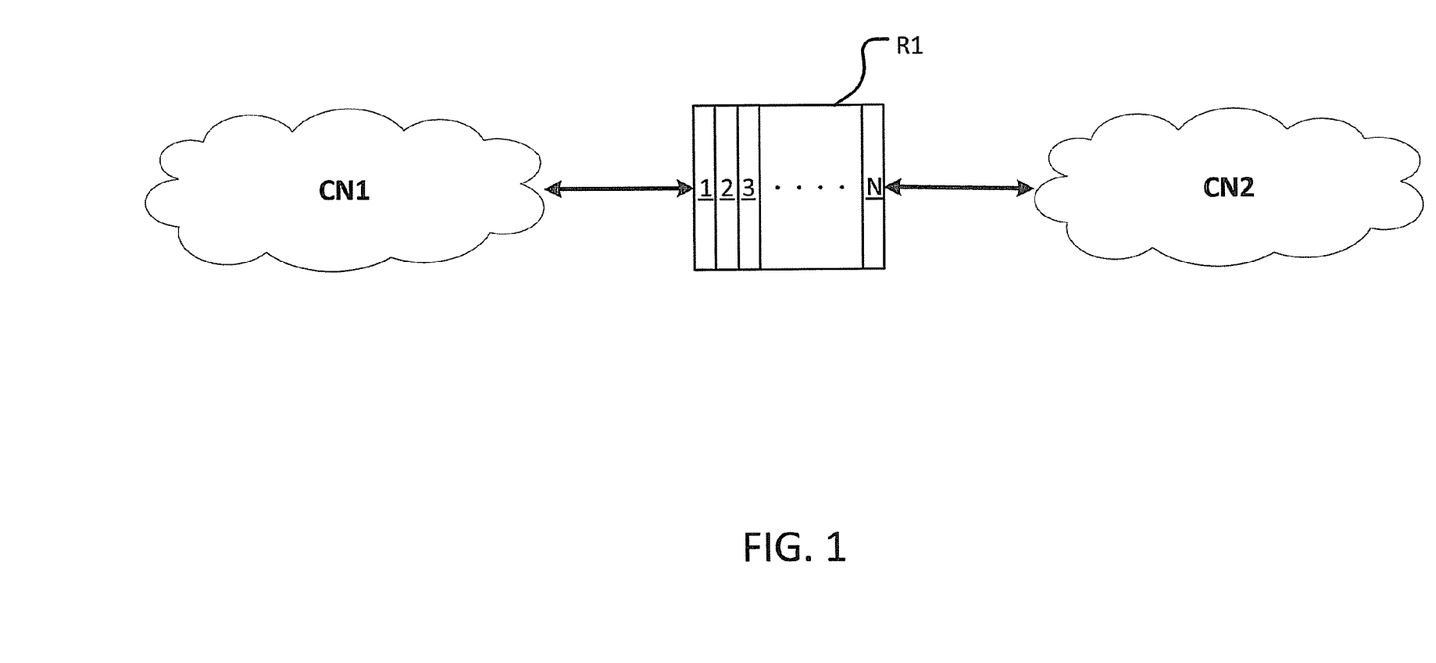
FIG. 1 illustrates a router situated between two computer networks.

FIG. 1 illustrates a router R1 situated between two computer networks CN1 and CN2.

Referring to FIG. 1, as with any well-known router, the router R1 is a network element or device that transfers data packets between multiple computer networks (e.g., CN1 and CN2 in FIG. 1). The computer networks CN1 and CN2 may be any suitable network over which computers are able to transfer information (e.g., packet switched networks, combination packet and circuit switched networks, etc.), such as a wide area network (WAN), local area network (LAN), etc.

The router R1 includes a plurality of line cards 1, 2, 3, ... N. Each line card 1 through N is a printed circuit board (PCB) having a transceiver (transmitter/receiver) port for a particular network (e.g., WAN, LAN, etc.) protocol (e.g., internet protocol (IP) or the like). Although shown as part of router R1, the line cards 1 through N may plug into telephone company switches.

When packets are transferred from, for example, computer network CN1 to computer network CN2, received packets are buffered at one or more of line cards 1 through N before being transmitted. In the three-level hierarchical model discussed above, the temporary storage or buffering occurs at the on-chip buffers within a network processor (NP) or application specific integrated circuit (ASIC), the off-chip cache static random access memory (SRAM), and/or off-chip bulk dynamic random access memory (DRAM) at a given line card of the router R1.

A line card according to an example embodiment will be described in more detail below with regard to FIG. 2. Although line card 1 is discussed with regard to FIG. 2, it should be understood that each of line cards 2 through N may be the same or substantially the same as the line card 1.

Although not discussed in detail herein, it should be understood that routers and/or line cards according to at least some example embodiments may be capable of performing all well-known functions in addition to the specific functionality discussed herein.

Figure 2:
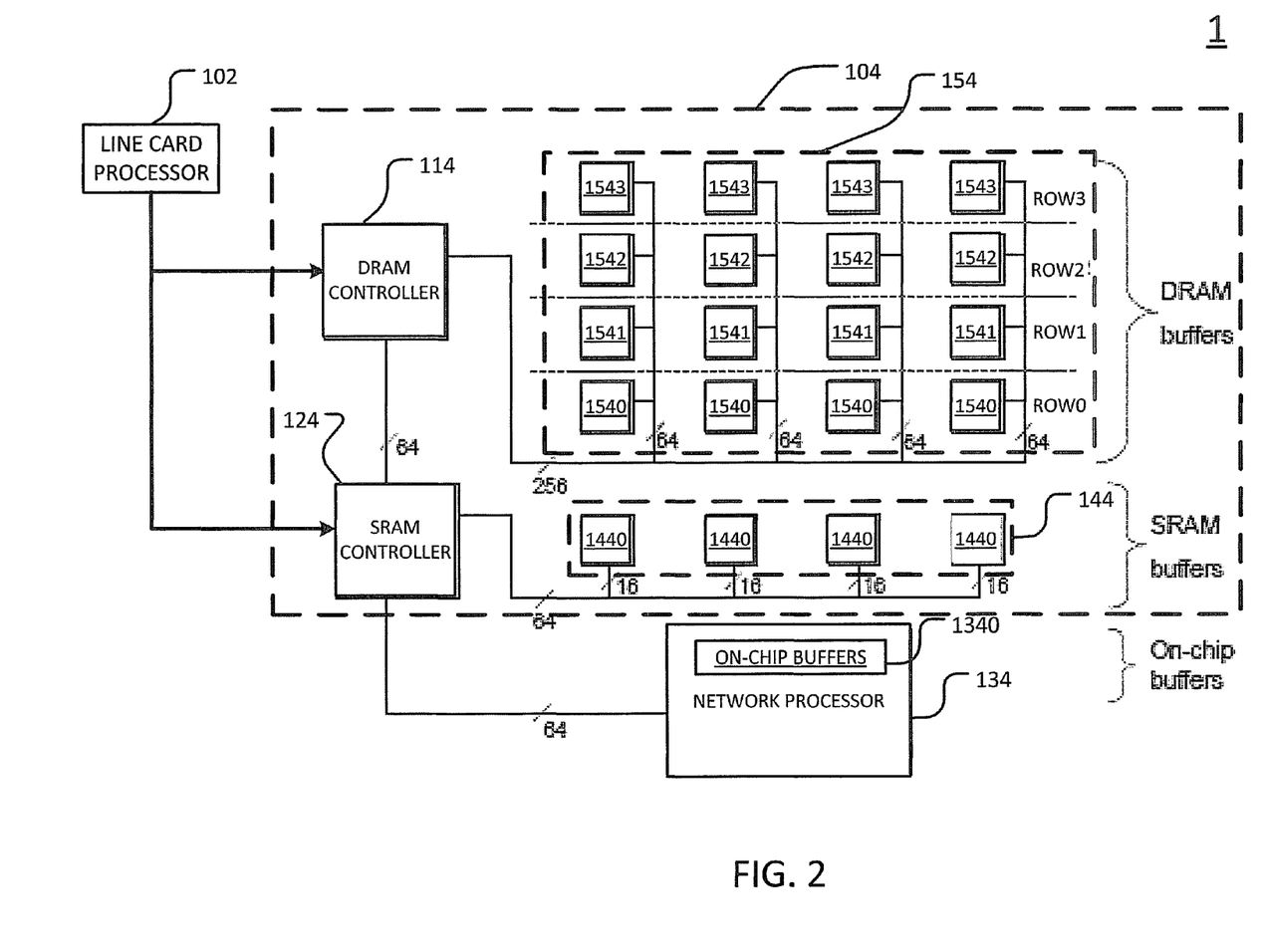
FIG. 2 is a block diagram illustrating a portion of a line card of a router according to an example embodiment.

FIG. 2 illustrates a portion of the line card 1 in the router R1 according to an example embodiment.

Referring to FIG. 2, the line card 1 includes a line card processor 102 coupled to an off-chip packet buffer block 104.

The off-chip packet buffer block 104 includes a SRAM controller 124 configured to control an off-chip cache SRAM block 144, and a DRAM controller 114 configured to control an off-chip bulk DRAM block 154.

In the example shown in FIG. 2, the off-chip cache SRAM block 144 is an SRAM module including a plurality of (e.g., four) SRAM chips 1440. In this example, each SRAM chip 1440 has 16 data-pins, and each set of 16 data-pins operates in parallel to provide a 64-bit data bus to a network processor 134 (via the SRAM controller 124) for increased throughput. The network processor 134 will be discussed in more detail later.

The off-chip cache SRAM block 144 shown in FIG. 2 includes a single row of SRAM chips 1440. However, it should be understood that the off-chip cache SRAM block 144 may include any number of rows of SRAM chips, and each row may include any number of SRAM chips.

As mentioned above, the SRAM controller 124 is configured to control the off-chip cache SRAM block 144. For example, the SRAM controller 124 is configured to turn the row of SRAM chips 1440 ON, OFF or cause the SRAM chips 1440 to enter a sleep state using well-known signaling and/or memory control techniques. The SRAM controller 124 may control the off-chip cache SRAM block 144 in response to signaling and/or instructions received from the line card processor 102.

Still referring to FIG. 2, the off-chip bulk DRAM block 154 includes a 4×4 array of DRAM chips 1540 through 1543, with multiple DRAM chips in each of rows ROW0 through ROW3. The DRAM chips in each of rows ROW0 through ROW3 operate in parallel to increase bandwidth. In the example shown in FIG. 2, the off-chip bulk DRAM block 154 is accessed via a 256-bit data bus.

In more detail with regard to the off-chip bulk DRAM block 154, the first row ROW0 includes a plurality of DRAM chips 1540 connected to the DRAM controller 114 in parallel, the second row ROW 1 includes a plurality of DRAM chips 1541 connected to the DRAM controller 114 in parallel, the third row ROW2 includes a plurality of DRAM chips 1542 connected to the DRAM controller 114 in parallel, and the fourth row ROW3 includes a plurality of DRAM chips 1543 connected to the DRAM controller 114 in parallel. Although only four rows of DRAM chips are shown in FIG. 2, it should be understood that the off-chip bulk DRAM block 154 may include any number of rows of DRAM chips, and each row may include any number of DRAM chips.

In practice, each row (or column, depending on the data-bus widths inside the router) of DRAM chips may be realized with a dual in-line memory module (DIMM), which is well-known in the art. The data-bus widths and number of memory chips in the figure are chosen merely to illustrate the concept, and may be adapted to specific routing platforms.

According to at least some example embodiments, each packet stored in the off-chip cache SRAM block 144 may be spread among (e.g., straddle) all SRAM chips 1440 in the block. Similarly, a packet stored in the off-chip bulk DRAM block 154 may be spread among (e.g., straddle) all DRAM chips within a given row of the DRAM array.

The line card processor 102 controls the off-chip cache SRAM block 144 and the off-chip bulk DRAM block 154 through memory controllers 124 and 114, respectively. A more detailed discussion of the operations performed by the line card processor 102 will be provided below with regard to FIG. 3.

Still referring to FIG. 2, the line card 1 further includes a network processor 134 configured to input/output packets to/from the line card 1. The network processor 134 includes an on-chip buffer memory 1340 including a plurality of on-chip buffers for buffering received data packets prior to being output by the line card 1.

For the sake of this disclosure, the on-chip buffer memory 1340 is assumed to have capacity $B_I$, which is typically a few tens or hundreds of Kilobytes. The capacity of the off-chip cache SRAM block 144 is denoted $B_S$, and is on the order of a few Megabytes. The capacity of the off-chip bulk DRAM block 154 is denoted $B_D$, and is on the order of several Gigabytes. Buffer memories discussed herein may support multiple first-in-first-out (FIFO) queues (e.g., per interface and/or class-of-service), and head and tail blocks of packets for each queue are movable between memory hierarchy levels as needed in a pipelined fashion.

As discussed herein, $N_R$ is used to denote the number of rows of DRAM chips in the off-chip bulk DRAM block 154 shown in FIG. 2. In the example shown in FIG. 2, $N_R$ is 4.

Memory controllers are typically integrated into custom ASICs, and there are often several concurrent controllers; however, for ease of depiction, FIG. 2 shows only a single aggregated DRAM controller 114 and a single integrated SRAM controller 124. As mentioned above, the DRAM controller 114 is configured to control the off-chip bulk DRAM block 154, and the SRAM controller 124 is configured to control the off-chip cache SRAM block 144 according to well-known methods.

In accordance with at least some example embodiments, entire rows of memory chips (e.g., DRAM and/or SRAM) are activated or deactivated (put to sleep or enter a sleep state) as needed.

Each corresponding controller may also be put to sleep or enter a sleep state if all memory chips in the corresponding off-chip memory are in the sleep state.

Example embodiments enable the active buffer capacity at the line card and the router to track the actual occupancy of the buffer, and to put to sleep any off-chip buffer memory that is not needed. In so doing, example embodiments may improve energy-efficiency of line cards and routers.

To control how aggressively or conservatively the buffer occupancy is tracked, a buffer occupancy threshold parameter $\alpha \in [0,1]$ is used.

According to at least some example embodiments, the buffer occupancy threshold parameter $\alpha$ is a fraction essentially representing a threshold occupancy of the total buffer capacity at the line card 1. By utilizing this buffer occupancy threshold parameter $\alpha$, the line card processor 102 is able to selectively switch on portions of buffer memory on an as-needed basis. The buffer occupancy threshold parameter $\alpha$ may be a parameter set by a user based on empirical data and/or study. The buffer occupancy threshold parameter $\alpha$ is a parameter chosen by a network operator depending on, for example, one or more of memory configuration, memory size, traffic characteristics, cost considerations (e.g., cost of power), criticality of traffic, etc.

In accordance with at least some example embodiments, the total active buffer capacity B at any time instant may be maintained between the lower bound of the current queue occupancy Q and the upper bound of the maximum available buffer space $(B_I+B_S+B_D)$. One example way to do this is to use a linear combination of the two extremes, that is, set the buffer capacity B according to Equation (1) shown below.

$$B=\alpha Q+(1-\alpha)(B_I+B_S+B_D) \quad (1)$$

Choosing an extremely conservative buffer occupancy threshold parameter $\alpha=0$ sets active buffers to maximum available buffers, essentially disabling power control. At the other (aggressive) extreme, choosing a buffer occupancy threshold parameter $\alpha=1$ causes the active buffer capacity to track the exact queue occupancy, which is essentially equivalent to saying that buffer space is created by activating memory as needed when a packet arrives. Because memory takes a non-zero time to become active, this may result in packet loss (e.g., substantial packet loss).

Choosing a buffer occupancy threshold parameter α between 0 and 1 enables control of energy versus loss trade-off.

Example embodiments selectively activate and de-activate buffers based on the buffer occupancy threshold parameter α and the current queue occupancy Q (in bytes).

Example embodiments may be implemented in hardware, and may be executed in response to changes in the queue occupancy Q, due to packet arrivals and/or departures.

According to at least some example embodiments, hysteresis protection is provided to suppress and/or prevent memory components from toggling between active and sleep states in quick succession. In this regard, example embodiments may include at least about a 1 ms delay before active memory components are put into a sleep state.

Figure 3:
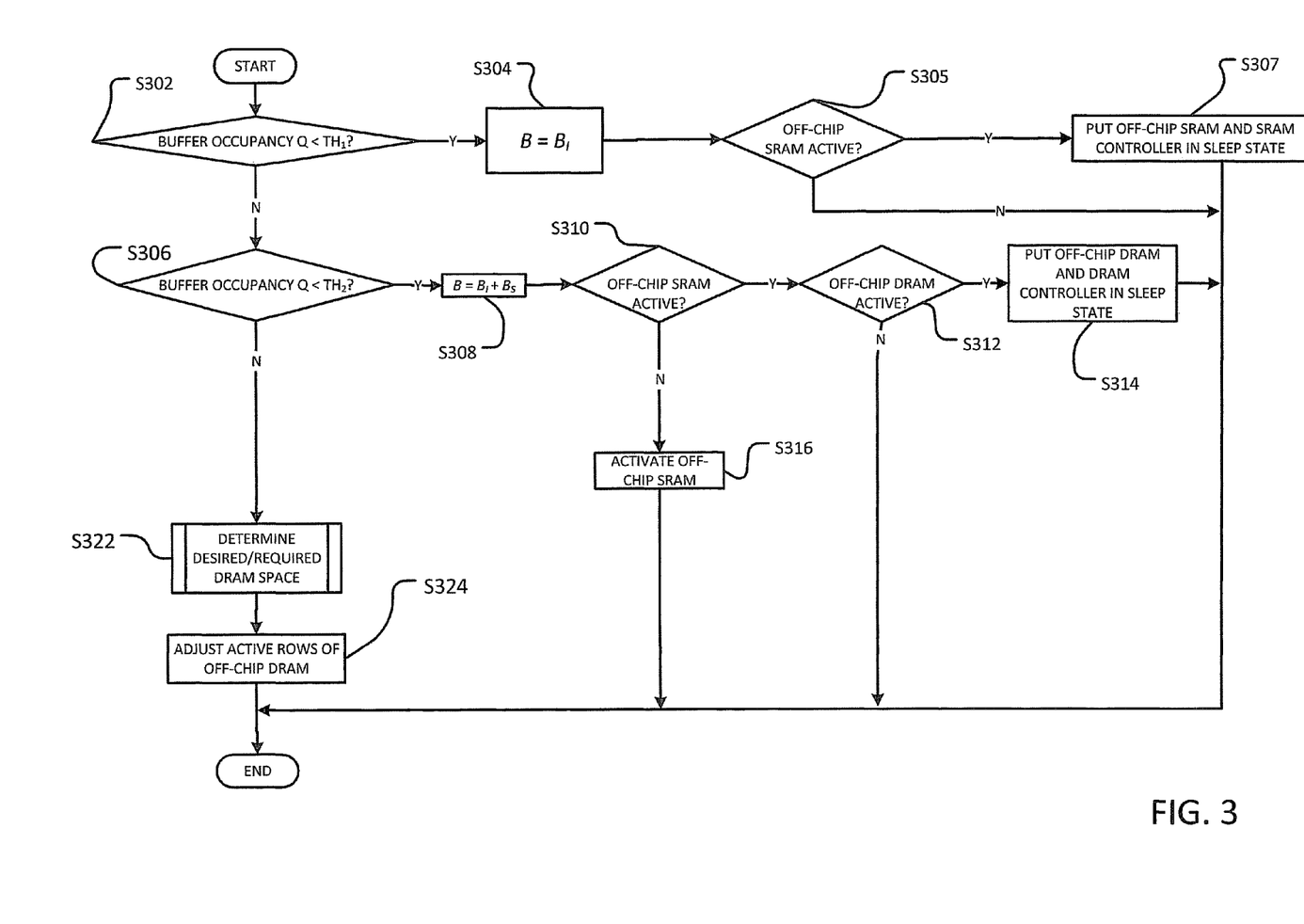
FIG. 3 is a flow chart illustrating a method for dynamic buffer adjustment at a router according to an example embodiment.

FIG. 3 is a flow chart illustrating an example embodiment of a method for dynamic buffer adjustment at a line card of a router. The method shown in FIG. 3 may be performed by the line card processor 102 at the line card 1 shown in FIG. 2. The method shown in FIG. 3 enables the line card processor 102 to control and/or adjust a total active buffer capacity at the line card 1. Similar methods may be performed at one or more of the other line cards 2 through N at the router R1.

As mentioned above, the method shown in FIG. 3 may be executed periodically and/or in response to changes in the queue occupancy Q due to packet arrivals and/or departures.

As discussed herein, when a buffer or buffer memory is referred to as "active," the buffer or buffer memory is both switched on and prepared to temporarily store (buffer) packet data received at the line card 1. When a buffer or buffer memory is referred to as "inactive" or "deactivated," the buffer or buffer memory is put to sleep or put into a sleep state and does not buffer packet data received at the line card 1.

In one example, a buffer memory (e.g., double data rate (DDR2) synchronous dynamic random-access memory (SDRAM)) may be put into sleep mode by toggling the clock enable pin (CKE). In another example, a buffer memory (e.g., an SRAM) may be put to sleep using the ZZ input pin.

In one example, as discussed herein, a sleep state refers to a relatively low power state or mode in which a buffer memory is not actively buffering data.

Referring to FIG. 3, at step S302, the line card processor 102 compares the current buffer occupancy Q at the line card 1 with a first buffer occupancy threshold $TH_1$. In this example, the first buffer occupancy threshold $TH_1$ is determined based on the buffer occupancy threshold parameter α and the capacity $B_I$ of the on-chip buffer memory 1340. In more detail, for example, the first buffer occupancy threshold $TH_1$ is calculated according to Equation (2).

$$TH_1 = \alpha B_I \quad (2)$$

If the current buffer occupancy Q is less than the first buffer occupancy threshold $TH_1$, then the line card processor 102 sets the buffer size B for the line card 1 equal to the capacity $B_I$ of the on-chip buffer memory 1340 at step S304.

The line card processor 102 then determines whether the off-chip cache SRAM block 144 is active at step S305. In one example, the line card processor 102 determines whether the off-chip cache SRAM block 144 is active through well-known signaling exchanges with the SRAM controller 124.

If the off-chip cache SRAM block 144 is active, then the line card processor 102 deactivates the off-chip cache SRAM block 144 at step S307. In this example, the line card processor 102 causes the off-chip cache SRAM block 104 to enter a sleep state. In one example, the line card processor 102 deactivates the off-chip cache SRAM block 144 via well-known signaling exchanges with the SRAM controller 124. Also at step S307, the line card processor 102 deactivates the SRAM controller 124, thereby causing the SRAM controller 124 to enter a sleep state. The process then terminates. In this case, because the off-chip cache SRAM block 144 and the off-chip bulk DRAM block 154 are in a sleep state, both of the controllers 114 and 124 may also be put into a sleep state.

Returning to step S305, if the off-chip cache SRAM block 144 is deactivated, then the line card process 102 need not deactivate the off-chip cache SRAM block 144, and the process terminates.

Returning to step S302, if the current buffer occupancy Q is greater than or equal to the first buffer occupancy threshold $TH_1$, then the line card processor 102 compares the current buffer occupancy Q at the line card 1 with a second buffer occupancy threshold $TH_2$ at step S306.

In this example, the second buffer occupancy threshold $TH_2$ is determined based on the buffer occupancy threshold parameter a and the aggregate capacity of the on-chip buffer memory 1340 and the off-chip cache SRAM block 144 ($B_I + B_S$). In more detail, for example, the second buffer occupancy threshold $TH_2$ is calculated according to Equation (3).

$$TH_2 = \alpha(B_I + B_S) \quad (3)$$

In Equation (3), $B_I$ is the capacity of the on-chip buffer memory 1340 and $B_S$ is the capacity of the off-chip cache SRAM block 144.

If the current buffer occupancy Q is less than the second buffer occupancy threshold $TH_2$, then the line card processor 102 sets the buffer size B for the line card 1 equal to the aggregate capacity of the on-chip buffer memory 1340 and the off-chip cache SRAM block 144 ($B_I + B_S$) at step S308.

The line card processor 102 then determines whether the off-chip cache SRAM block 144 is active at step S310. The line card processor 102 determines whether the off-chip cache SRAM block 144 is active in the same manner as at step S305.

If the off-chip cache SRAM block 144 is active, then the line card processor 102 determines whether the off-chip bulk DRAM block 154 is active at step S312. The line card processor 102 determines whether the off-chip bulk DRAM block 154 is active in the same manner as discussed above with regard to the off-chip cache SRAM block 144 at step S305.

If the off-chip bulk DRAM block 154 is deactivated (in a sleep state), then the process terminates.

Returning to step S312, if the off-chip bulk DRAM block 154 is active, then the line card processor 102 de-activates the off-chip bulk DRAM block 154 at step S314. In this case, the line card processor 102 causes the off-chip bulk DRAM block 154 to enter a sleep state. In this example, at step S314, the line card processor 102 also causes the DRAM controller 114 to enter a sleep state. The process then terminates.

Returning to step S310, if the off-chip cache SRAM block 144 is deactivated (in a sleep state), then the line card processor 102 activates the off-chip cache SRAM block 144 at step S316. The process then terminates.

Returning to step S306 in FIG. 3, if the current buffer occupancy Q is greater than or equal to the second buffer occupancy threshold $TH_2$, then the line card processor 102 determines a desired and/or required amount of DRAM space in the off-chip bulk DRAM block 154 to be activated at step S322. In so doing, the line card processor 102 determines a number of rows of DRAM at the off-chip bulk DRAM block 154 to be activated at the line card 1. An example manner in which the line card processor 102 determines the desired and/or required amount of DRAM space will be described in more detail later with regard to FIG. 4.

After determining the desired and/or required DRAM space at step S322, the line card processor 102 adjusts the active number of rows in the off-chip bulk DRAM block 154 by activating and de-activating rows of DRAM accordingly at step S324. The process then terminates.

According to at least some example embodiments, after setting the buffer size B, the line card processor 102 may activate and de-activate buffer memory at the off-chip packet buffer block 104 directly, or via the controllers 114 and 124. In one example, with regard to the off-chip bulk DRAM block 154, the line card processor 102 informs the DRAM controller 114 of the number of rows of DRAM chips needed via well-known signaling, and the DRAM controller 114 controls the off-chip bulk DRAM block 154 accordingly to obtain the desired buffer size B. Similarly, with regard to the off-chip cache SRAM block 144, the line card processor 102 informs the SRAM controller 124 that the off-chip cache SRAM block 144 is to be activated or deactivated via well-known signaling, and the SRAM controller 124 controls the off-chip cache SRAM block 144 accordingly to obtain the desired buffer size B.

Figure 4:
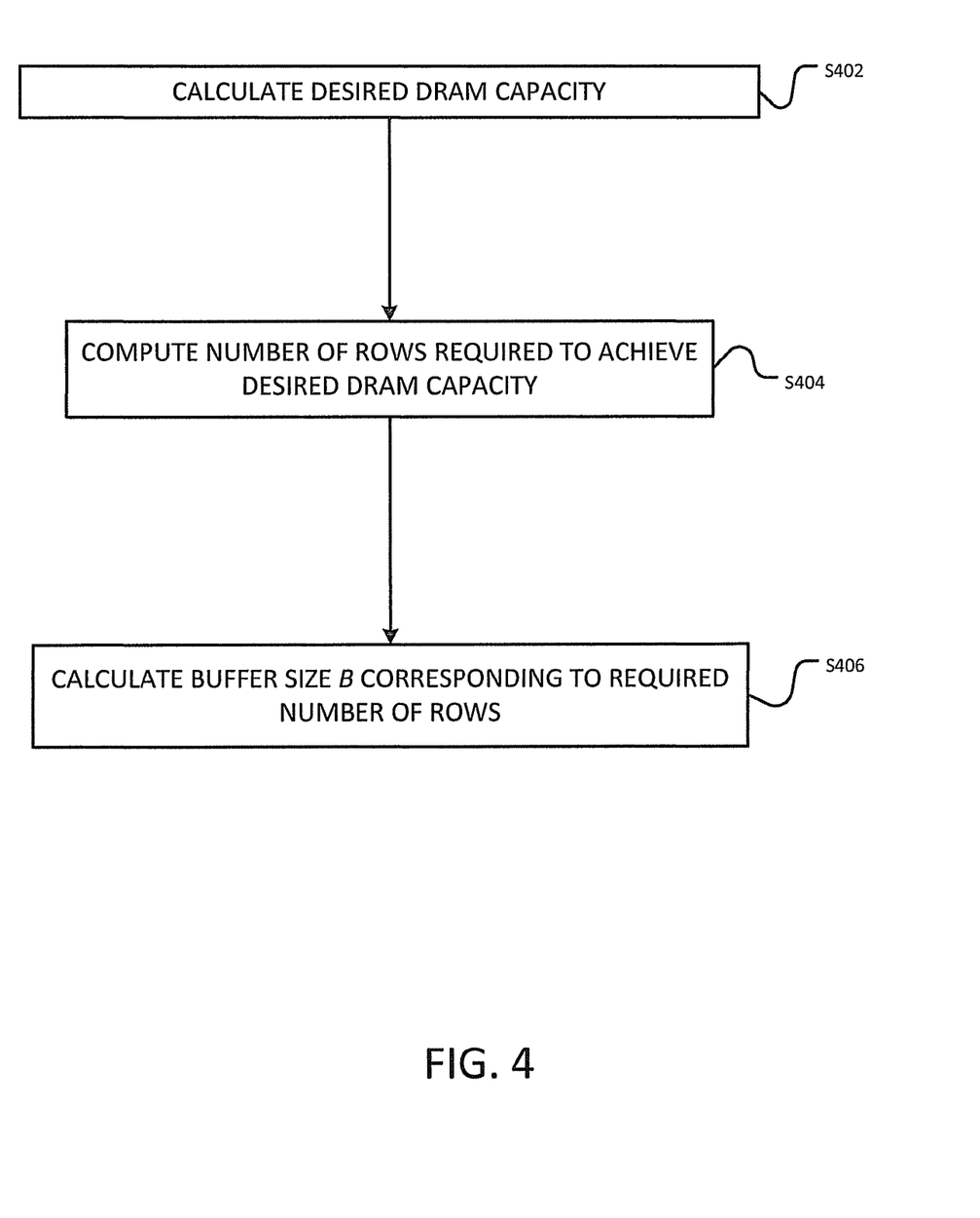
FIG. 4 is a flow chart illustrating an example embodiment of a method for determining desired/required off-chip bulk memory space at a line card.

FIG. 4 illustrates is a flow chart illustrating an example embodiment of step S322 shown in FIG. 3.

Referring to FIG. 4, at step S402 the line card processor 102 calculates a desired and/or required DRAM capacity $B_A$. In one example, the line card processor 102 calculates the desired DRAM capacity according to Equation (4) shown below.

$$B_A = (1-\alpha)B_D + \alpha \max\{0, (Q-B_I-B_S)\} \qquad (4)$$

In Equation (4), $B_D$ is the capacity of the off-chip bulk DRAM block 154, $\alpha$ is the buffer occupancy threshold parameter, Q is the amount of data currently in the buffer queue at the line card 1, $B_S$ is the capacity of the off-chip cache SRAM block 144, and $B_I$ is the on-chip buffer memory 1340.

After calculating the desired DRAM capacity $B_A$, the line card processor 102 computes the number of rows $K_D$ of DRAM required to obtain the desired DRAM capacity $B_A$ at step S404. In one example, the line card processor 102 computes the number of rows $K_D$ according to Equation (5) shown below.

$$K_D = \left\lceil \frac{B_A}{B_D/N_R} \right\rceil \qquad (5)$$

In Equation (5), $B_D$ is again the capacity of the off-chip bulk DRAM block 154, $B_A$ is the desired DRAM capacity calculated according to Equation (4), and $N_R$ is the total number of rows of DRAM chips at the off-chip bulk DRAM block 154.

After computing the number of rows $K_D$ of DRAM chips at step S404, the line card processor 102 calculates the buffer size B at step S406. In one example, the line card processor 102 calculates the buffer size B according to Equation (6) shown below.

$$B = \frac{K_D B_D}{N_R} + B_I + B_S \qquad (6)$$

In Equation (6), $K_D$ is the number of rows of DRAM chips calculated at step S404, $B_D$ is the total capacity of the off-chip bulk DRAM block 154, $N_R$ is the total number of rows of DRAM chips at the off-chip bulk DRAM block 154, $B_I$ is the capacity of the on-chip buffer memory 1340, and $B_S$ is the capacity of the off-chip cache SRAM block 144.

As mentioned above, example embodiments may be implemented in hardware, and may be executed in response to changes in the queue occupancy Q, due to packet arrivals and/or departures.

According to at least some example embodiments, if the buffer occupancy threshold parameter $\alpha$ is chosen such that $(1-\alpha)$ is a negative power of 2 (e.g., $\alpha$=0.75 or 0.875), methods according to at least some example embodiments may be implemented/performed without any multiplication or division operations because products may be precomputed for a given buffer occupancy threshold parameter $\alpha$, and step S322 in FIG. 3 may be realized using shift and add operations.

Although discussed above with regard to the flow chart shown in FIGS. 3 and 4, a method for dynamic adjustment of buffer size at a router may be implemented and/or explained by the following pseudo-code. In the following example code, the variables are the same as those discussed above.

```
1:   if Q < αB_I then
2:       B = B_I /*on-chip buffers only*/
3:   else if Q < α(B_I + B_S) then
4:       B = B_I + B_S /*on-chip and SRAM buffers*/
5:   else
6:       B_A = (1 - α)B_D + α max {0,(Q - B_I,-B_S)}
7:       K_D = ⌈ B_A / (B_D/N_R) ⌉ /*number of DRAM rows*/
8:       B = (K_D B_D)/N_R + B_I + B_S
9:   end if
10:  output B
```

The invention being thus described, it will be obvious that the same may be varied in many ways. Such variations are not to be regarded as a departure from the invention, and all such modifications are intended to be included within the scope of the invention.

We claim:

1. A method for dynamic buffer adjustment at a line card of a router, the method comprising:
comparing a current buffer occupancy at the line card with at least a first buffer occupancy threshold, the first buffer occupancy threshold being calculated based on a buffer occupancy threshold parameter and a capacity of at least a first buffer memory at the line card; and
adjusting an active buffer capacity by at least one of activating and deactivating buffer memory blocks at the line card based on the comparing step, the activating including switching on the buffer memory blocks, and the deactivating including causing the buffer memory blocks to enter a sleep state, the active buffer capacity being a size of active buffer memory at the line card, the active buffer memory at the line card including the first buffer memory and the activated buffer memory blocks at the line card, the size of the active buffer memory at the line card being an amount of data capable of being stored in the active buffer memory at the line card, and the current buffer occupancy being an amount of data currently being stored in the active buffer memory at the line card; wherein
the first buffer memory is a first cache memory at a network processor at the line card, and
the buffer memory blocks include at least one of a second cache memory block and first bulk memory block at the line card.

2. The method of claim 1, wherein the first buffer memory is a first cache memory at a network processor at the line card, the method further including,
buffering packet data in only the first buffer memory if the current buffer occupancy is less than the first buffer occupancy threshold.

3. The method of claim 1, further comprising:
buffering packet data in the first cache memory and the second cache memory block if the current buffer occupancy is greater than the first buffer occupancy threshold.

4. The method of claim 1, wherein the adjusting step comprises:
activating the second cache memory block if the current buffer occupancy is greater than the first buffer occupancy threshold.

5. The method of claim 1, wherein the comparing step comprises:
first comparing the current buffer occupancy with the first buffer occupancy threshold; and
second comparing the current buffer occupancy with a second buffer occupancy threshold if the current buffer occupancy is greater than or equal to the first buffer occupancy threshold; and wherein
the adjusting step adjusts the active buffer capacity based on the second comparing step.

6. The method of claim 5, wherein the adjusting step comprises:
activating the second cache memory block; and
deactivating the first bulk memory block if the current buffer occupancy is less than the second buffer occupancy threshold.

7. The method of claim 5, wherein the adjusting step comprises:
first activating the second cache memory block; and
second activating the first bulk memory block if the current buffer occupancy is greater than or equal to the second buffer occupancy threshold.

8. The method of claim 7, wherein the second activating step comprises:
computing an amount of first bulk memory space to be activated at the line card based on the current buffer occupancy; and
activating at least a portion of the first bulk memory block based on the computed amount of first bulk memory space.

9. The method of claim 8, wherein the computing step comprises:
calculating a number of rows of a first bulk memory required to obtain the amount of first bulk memory space to be activated at the line card; and wherein
the second activating step activates the calculated number of rows of the first bulk memory.

10. The method of claim 7, further comprising:
buffering packet data in the first buffer memory, the second cache memory block and the first bulk memory block if the current buffer occupancy is greater than the second buffer occupancy threshold.

11. The method of claim 5, wherein the second buffer occupancy threshold is calculated based on the buffer occupancy threshold parameter and an aggregate of a capacity of the first cache memory and a capacity of the second cache memory block.

12. The method of claim 1, wherein the first cache memory is an on-chip cache memory block, the second cache memory block is an off-chip cache memory block, and the first bulk memory block is an off-chip bulk memory block.

13. A line card for a router, the line card comprising:
at least a first buffer memory; and
a line card processor configured to compare a current buffer occupancy at the line card with at least a first buffer occupancy threshold, the first buffer occupancy threshold being calculated based on a buffer occupancy threshold parameter and a capacity of the first buffer memory at the line card, the line card processor being further configured to adjust an active buffer capacity by at least one of activating and deactivating buffer memory blocks at the line card based on the comparison, the activating including switching on the buffer memory blocks, and the deactivating including causing the buffer memory blocks to enter a sleep state, the active buffer capacity being a size of active buffer memory at the line card, the active buffer memory at the line card including the first buffer memory and the activated buffer memory blocks at the line card, the size of the active buffer memory at the line card being an amount of data capable of being stored in the active buffer memory at the line card, and the current buffer occupancy being an amount of data currently being stored in the active buffer memory at the line card; wherein
the first buffer memory is a first cache memory at a network processor at the line card, and
the buffer memory blocks include at least one of a second cache memory block and first bulk memory block at the line card.

14. The line card of claim 13 further comprising:
a first buffer memory block; wherein
the line card processor is further configured to at least one of activate and deactivate the first buffer memory block at the line card based on the comparison between the current buffer occupancy and the first buffer occupancy threshold.

15. The line card of claim 14, wherein the first buffer memory block comprises:
the second cache memory block configured to buffer packet data received at the line card; and
a second cache memory controller configured to control the second cache memory block.

16. The line card of claim 15, wherein the first buffer memory block comprises:
the first bulk memory block configured to buffer packet data received at the line card; and
a first bulk memory controller configured to control the first bulk memory block.

17. The line card of claim 14, wherein the line card processor is further configured to compare the current buffer occupancy with a second buffer occupancy threshold if the current buffer occupancy is greater than or equal to the first buffer occupancy threshold, and to adjust the active buffer capacity based on the current buffer occupancy with the second buffer occupancy threshold.

18. The line card of claim 17, wherein the line card processor is configured to deactivate the first bulk memory block if the current buffer occupancy is less than the second buffer occupancy threshold.

19. The line card of claim 17, wherein the line card processor is configured to activate the first bulk memory block if the current buffer occupancy is greater than or equal to the second buffer occupancy threshold.

20. The line card of claim 19, wherein the line card processor is further configured to compute an amount of first bulk memory space needed at the line card based on the current buffer occupancy, and activate at least a portion of the first bulk memory block based on the computed amount of first bulk memory space.

* * * * *